US009614416B2

(12) United States Patent
Schrage et al.

(10) Patent No.: US 9,614,416 B2
(45) Date of Patent: Apr. 4, 2017

(54) DRIVE MODULE FOR A VEHICLE

(71) Applicant: Dr. Ing. h.c. F. Porsche Aktiengesellschaft, Stuttgart (DE)

(72) Inventors: Henrik Schrage, Vaihingen an der Enz (DE); Sebastian Wachter, Pressig (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 320 days.

(21) Appl. No.: 14/540,558

(22) Filed: Nov. 13, 2014

(65) Prior Publication Data
US 2015/0137631 A1 May 21, 2015

(30) Foreign Application Priority Data

Nov. 15, 2013 (DE) .......................... 10 2013 112 605

(51) Int. Cl.
*H02K 9/08* (2006.01)
*H02K 9/12* (2006.01)
*H02K 9/10* (2006.01)
*H02K 1/20* (2006.01)
*H02K 5/20* (2006.01)
(Continued)

(52) U.S. Cl.
CPC ................. *H02K 9/08* (2013.01); *H02K 1/20* (2013.01); *H02K 5/20* (2013.01); *H02K 7/006* (2013.01); *H02K 9/06* (2013.01); *H02K 9/10* (2013.01); *H02K 9/12* (2013.01); *B60K 11/06* (2013.01); *B60K 2001/006* (2013.01); *Y10S 903/906* (2013.01)

(58) Field of Classification Search
CPC ... H02K 9/08; H02K 9/10; H02K 9/12; B60K 11/02; B60K 11/06; Y10S 903/906

USPC ....... 310/52, 58, 59, 62; 180/65.25; 903/906
IPC ......................................................... H02K 9/08
See application file for complete search history.

(56) References Cited

U.S. PATENT DOCUMENTS 5,789,833 A    8/1998    Kinoshita et al.
6,114,784 A *   9/2000    Nakano ................... B60K 6/26
                                                            310/113
(Continued)

FOREIGN PATENT DOCUMENTS

DE      1813190      6/1960
DE      1638313      5/1971
(Continued)

OTHER PUBLICATIONS

German Priority Appl. No. 10 2013 112 605.7-German Search Report issued Aug. 18, 2015.

*Primary Examiner* — John K Kim
(74) *Attorney, Agent, or Firm* — Gerald E. Hespos; Michael J. Porco; Matthew T. Hespos

(57) ABSTRACT

A drive module for a vehicle has a transmission (12) and an electric machine (11) that is coupled to an input shaft (16) of the transmission (12). An air-filled cavity (23) is formed between the electric machine (11) and the transmission (12). The electric machine (11) is an external-rotor motor with a rotor (24) that surrounds the stator (25). A fan impeller (31) rotates with the rotor (24) and draws air out of the air-filled cavity (23) in an axial direction, draws the air through windings (27) of the stator (25) for cooling, and subsequently conveys the air in the radial direction into a housing-side flow duct (34) in which heated air can be accumulated and via which the air can be returned toward the cavity (23). The heated air can be cooled in the region of the flow duct (34) and/or in the region of the cavity (23).

15 Claims, 6 Drawing Sheets

(51) Int. Cl.
*H02K 7/00* (2006.01)
*H02K 9/06* (2006.01)
*B60K 11/06* (2006.01)
*B60K 1/00* (2006.01)

(56) References Cited

U.S. PATENT DOCUMENTS

| | | | |
|---|---|---|---|
| 6,124,567 A | 9/2000 | Feldhausen et al. | |
| 6,175,171 B1 | 1/2001 | Rupp et al. | |
| 6,570,276 B1* | 5/2003 | Morel | H02K 9/06 |
| | | | 310/52 |
| 6,590,312 B1* | 7/2003 | Seguchi | B60K 6/26 |
| | | | 310/114 |
| 7,259,493 B2* | 8/2007 | Oshidari | B60K 6/26 |
| | | | 180/65.6 |
| 7,863,787 B2* | 1/2011 | Lafontaine | H02K 3/50 |
| | | | 310/71 |
| 2013/0015733 A1* | 1/2013 | Rasch | H02K 1/145 |
| | | | 310/59 |
| 2015/0137631 A1* | 5/2015 | Schrage | H02K 9/08 |
| | | | 310/54 |

FOREIGN PATENT DOCUMENTS

| | | |
|---|---|---|
| DE | 19648455 | 10/1997 |
| DE | 19948224 | 6/2001 |
| DE | 10257256 | 6/2004 |
| DE | 102004044688 | 5/2006 |
| DE | 102012003101 | 8/2013 |

\* cited by examiner

DRIVE MODULE FOR A VEHICLE

CROSS-REFERENCE TO RELATED APPLICATION

This application claims priority on German Patent Application No. 10 2013 112 605.7, filed Nov. 15, 2013, the entire disclosure of which is incorporated herein by reference.

BACKGROUND

1. Field of the Invention

The invention relates to a drive module for a vehicle.

2. Description of the Related Art

A drivetrain of a hybrid vehicle has a hybrid drive that includes an internal combustion engine, an electric machine and a transmission interposed between the hybrid drive and a drive output. The electric machine preferably is coupled permanently to a transmission input shaft of the transmission, and the internal combustion engine either is coupled to or decoupled from the transmission depending on the switching position of a separating clutch. Both the electric machine and the internal combustion engine can impart a drive torque to the transmission input shaft when the separating clutch is closed. By contrast, only the electric machine can impart a drive torque to the transmission input shaft of the transmission when the separating clutch is open. The electric machine, the transmission and the separating clutch form a hybrid module with an air-cooled cavity formed between the electric machine and the transmission. During operation, heat is generated at the electric machine of the hybrid module, and the heat must be dissipated in an effective manner for cooling purposes. The same applies to an electric module of an electric vehicle that comprises an electric machine and a transmission, but no separating clutch.

U.S. Pat. No. 6,175,171 discloses an electric drive motor in the form of an external-rotor motor. Concentric cooling fins are formed on a radial surface of a stator-side support that faces toward a rotor of the motor.

U.S. Pat. No. 6,114,784 discloses a cooling concept for a hybrid drive where pairs of cooling jackets are formed in a stator of an electric machine. Coolant inlet openings function for conducting coolant to the cooling jackets, whereas coolant outlet openings function for discharging the coolant from the cooling jackets. A coolant return flow section connects each pair of cooling jackets.

It is possible for electric machines to be cooled to a certain extent with the cooling concepts known from the prior art. However, there is a demand for a drive module that permits effective cooling at high rotational speeds of the electric machine and in the presence of intense heat generation.

The invention is based on the object of providing a novel drive module for a vehicle.

SUMMARY OF THE INVENTION

The invention relates to an electric machine in the form of an external-rotor motor. The rotor part of the external-rotor motor surrounds the stator part of the external-rotor motor, at least in sections, to the outside as viewed in a radial direction. The rotor part of the electric machine has a fan impeller that rotates together with the rotor part and that draws air out of the air-filled cavity in an axial direction, draws the air through windings of the stator for cooling purposes, and subsequently conveys the air in the radial direction into a housing-side flow duct in which the heated air can be accumulated and via which the heated air can be returned in the direction of the cavity. The heated air can be cooled in the region of the flow duct and/or in the region of the cavity.

The drive module comprises a fan impeller that rotates with the rotor part of the electric machine. The fan impeller draws air out of the cavity in an axial direction, conducts the air through windings of the stator for cooling purposes, and subsequently conveys the air in the radial direction into the housing-side flow duct. In the housing-side flow duct, the heated air can be accumulated and conducted back in the direction of the cavity. The heated air is cooled in the region of the flow duct and/or in the region of the cavity. Accordingly, for purposes of cooling the electric machine of the drive module, the invention utilizes air circulation within the module, with the air being cooled in the region of the flow duct and/or in the region of the cavity. Thus, highly effective cooling of the electric machine of the drive module is achieved.

The flow duct may have a first section that extends along the circumferential extent of the fan impeller with a radial spacing to the fan impeller so that along the circumferential extent of the fan impeller, heated air flows from the fan impeller into the flow duct in the radial direction. The air that is heated in the region of the windings can be accumulated in an effective manner in the first section of the flow duct.

A flow cross section of the first section of the flow duct may increase in size as viewed in the throughflow direction thereof and in the direction of rotation of the fan impeller. The increase in size of the flow cross section of the first section of the flow duct ensures that, over the circumferential extent of the first section of the flow duct as viewed in the direction of rotation of the fan impeller, all of the air that enters the first section in the radial direction can be accumulated and discharged effectively.

A second section of the flow duct that adjoins the first section of the flow duct conducts the heated air in the axial direction from the first section of the flow duct in the direction of the cavity. The second section of the flow duct preferably is assigned a water-cooled cooler for cooling the heated air in the region of the flow duct.

Air that is accumulated in the first section of the flow duct can be conducted back in the direction of the cavity via the second section of the flow duct. If heated air is cooled in the region of the flow duct, the second section of the flow duct preferably is assigned at least one water-cooled cooler as a heat sink. This permits effective cooling of the heated air in the region of the flow duct.

The fan impeller and the rotor to which the fan impeller is connected may have recesses that are spaced apart from one another in a circumferential direction and that permit a passage of heated air in the radial direction from the windings of the stator into the first section of the flow duct. The fan impeller preferably concentrically surrounds the rotor, in sections, radially to the outside so that the recesses of fan impeller and rotor are at least partially in alignment in a radial direction. The recesses in the region of the rotor of the electric machine and of the fan impeller allow air that is heated in the region of the windings of the stator to be transported in an effective manner in the direction of the flow duct, specifically in the direction of the first section of the flow duct.

The air-filled cavity is delimited in an axial direction adjacent to the electric machine by a support of the stator and adjacent to the transmission by a cover of the transmission.

The support of the stator may be water-cooled for cooling the heated air in the region of the cavity. If the heated air is to be cooled in the region of the cavity, the support of the stator may be utilized as a heat sink. For this purpose, the support of the stator of the electric machine is of water-cooled design.

Exemplary embodiments of the invention will be explained in more detail on the basis of the drawings, without the invention being restricted to said exemplary embodiments.

DETAILED DESCRIPTION

Figure 1:
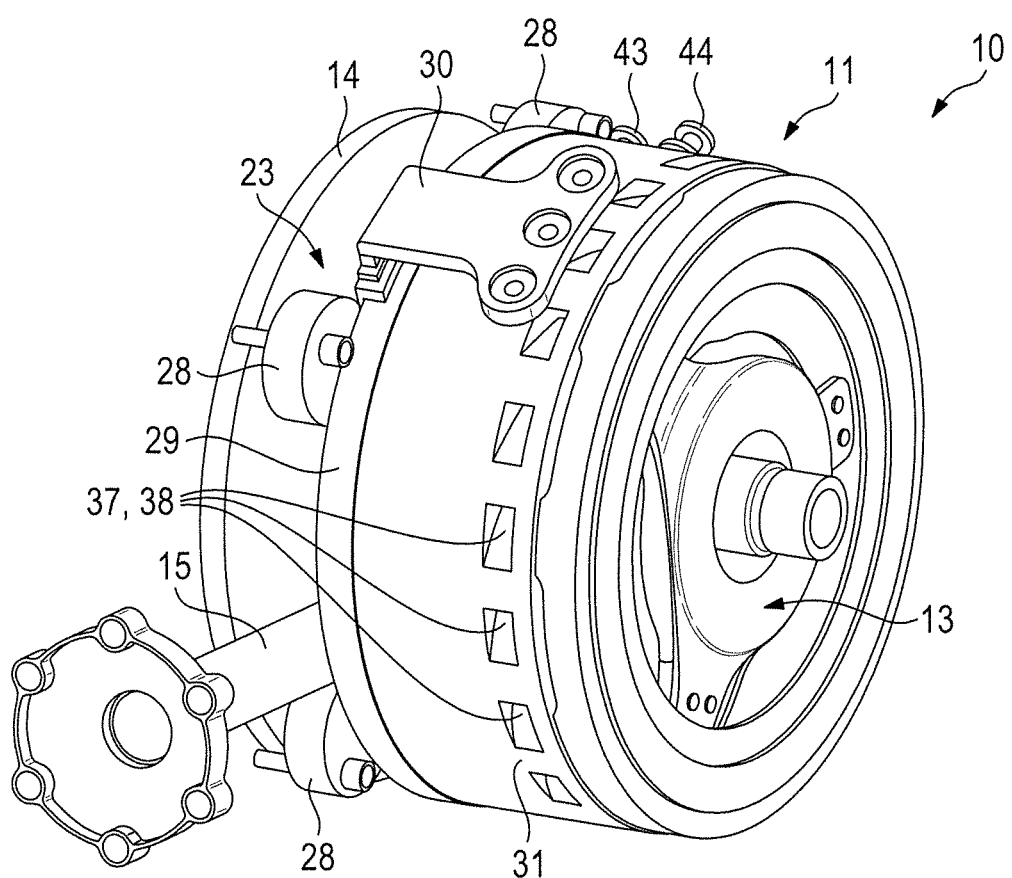
FIG. 1 is a perspective view of some assemblies of a drive module according to the invention in the form of a hybrid module.
Figure 2:
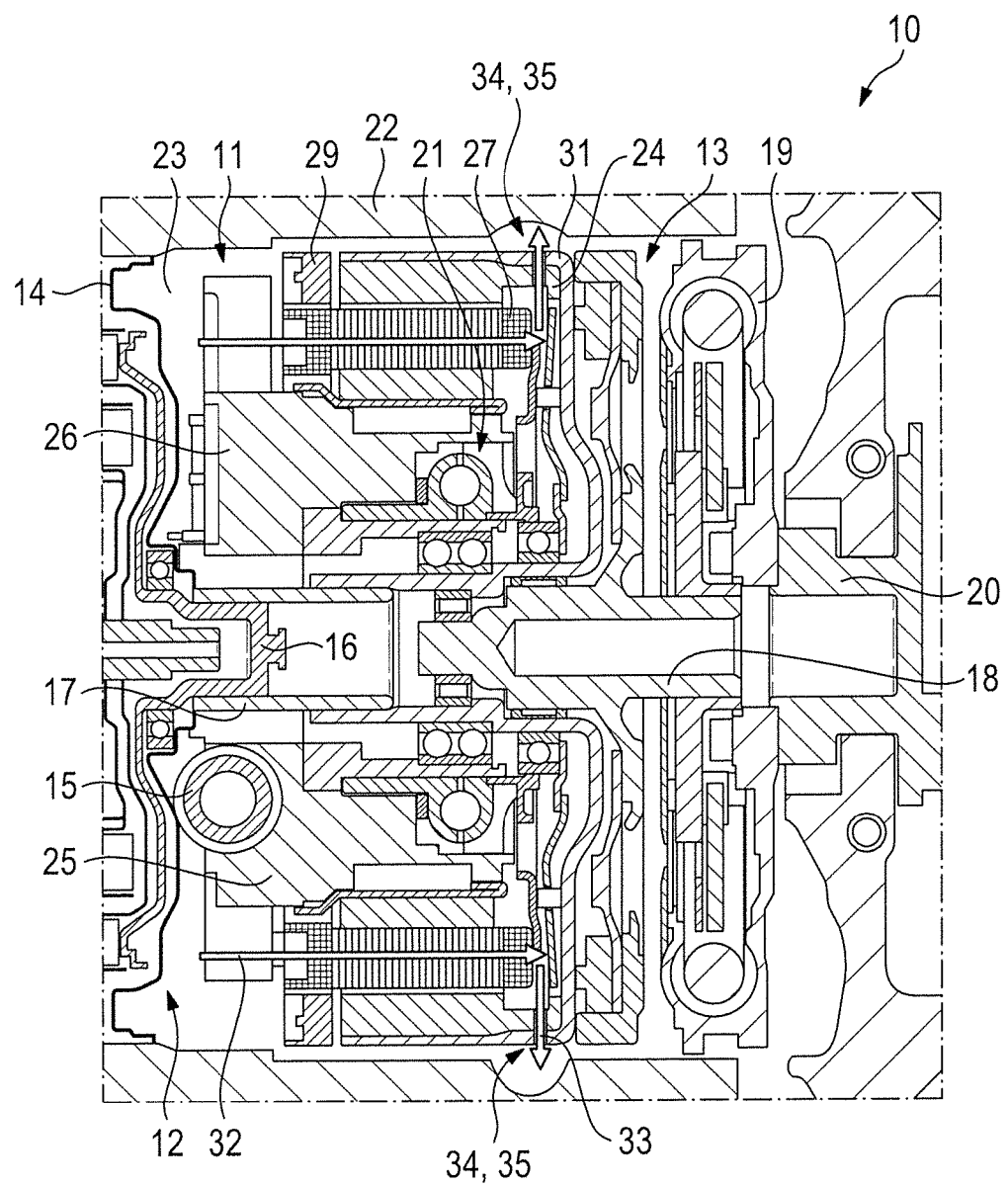
FIG. 2 is a detail cross section through the hybrid module of FIG. 1.
Figure 3:
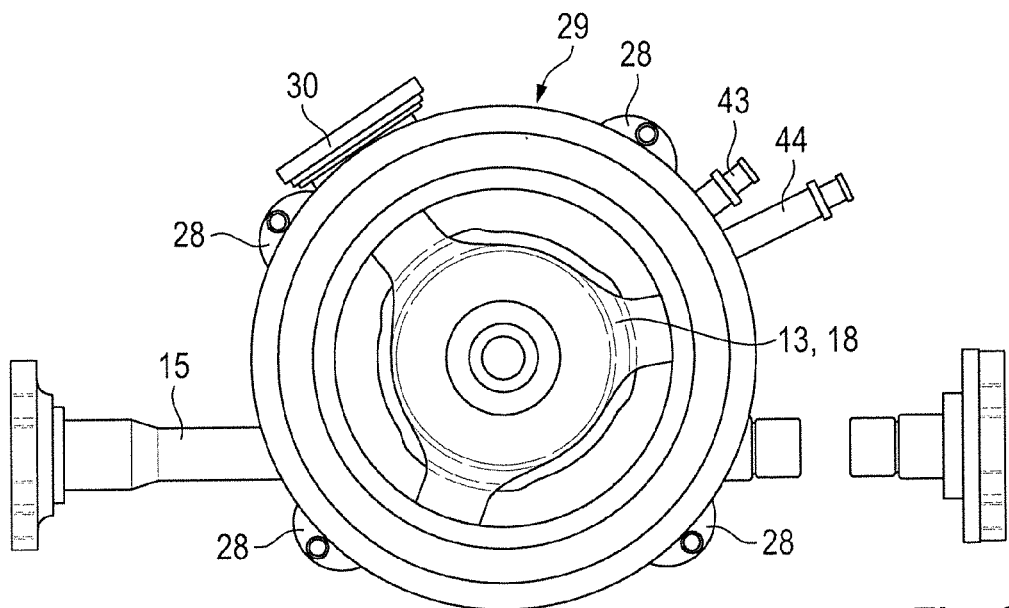
FIG. 3 is a view of the arrangement of FIG. 1 in the view direction III from FIG. 1.
Figure 4:
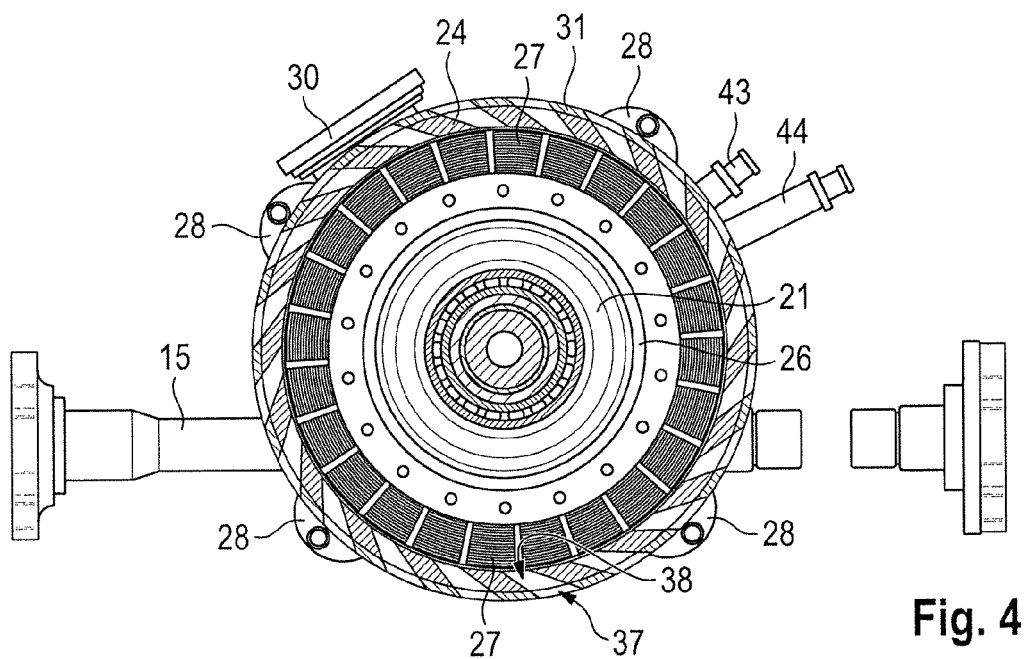
FIG. 4 is a cross section through FIG. 3.
Figure 5:
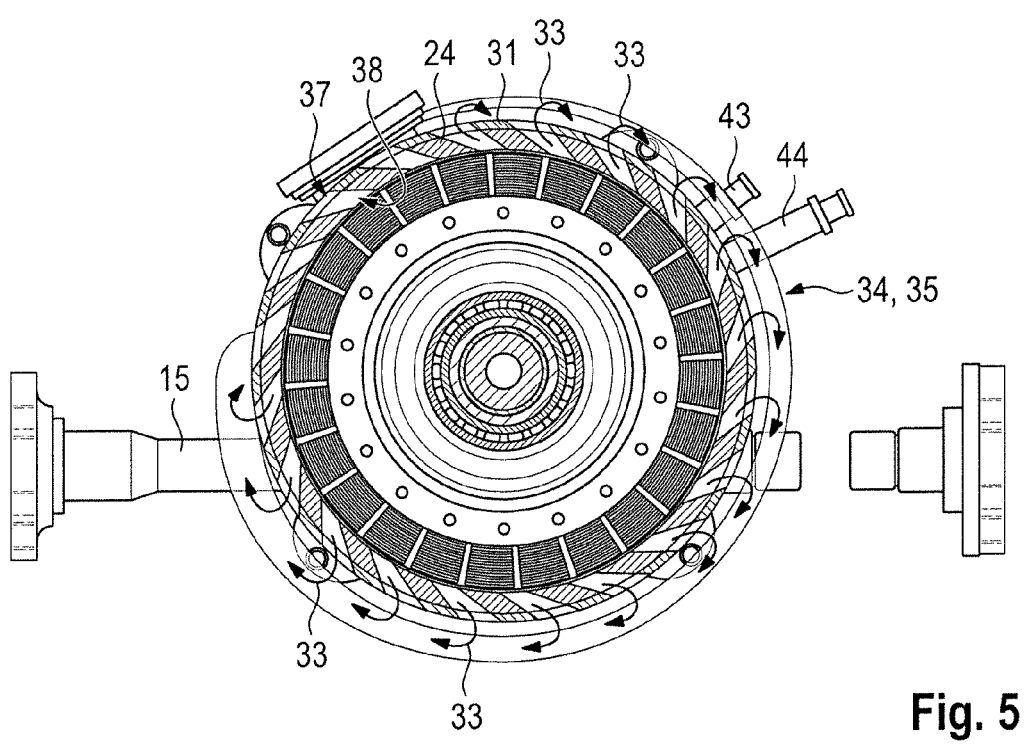
FIG. 5 shows the cross section from FIG. 4 together with a flow path of heated air.
Figure 6:
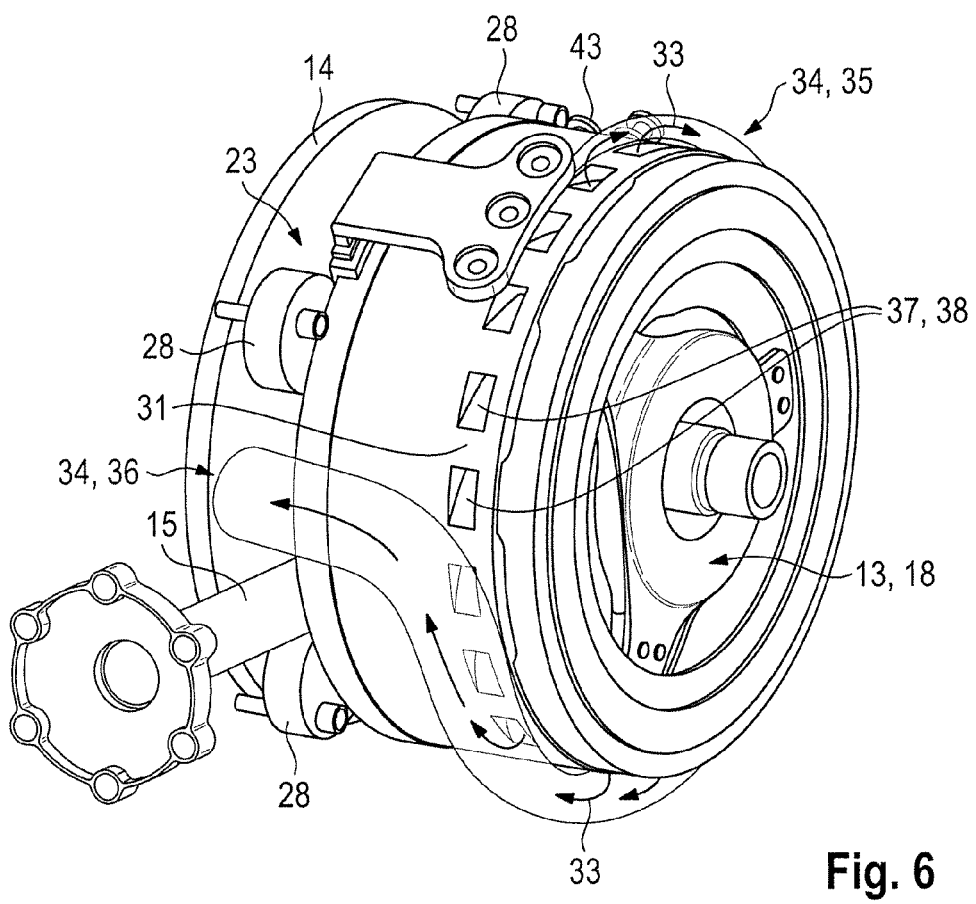
FIG. 6 shows the arrangement of FIG. 1 together with a flow path of heated air.
Figure 7:
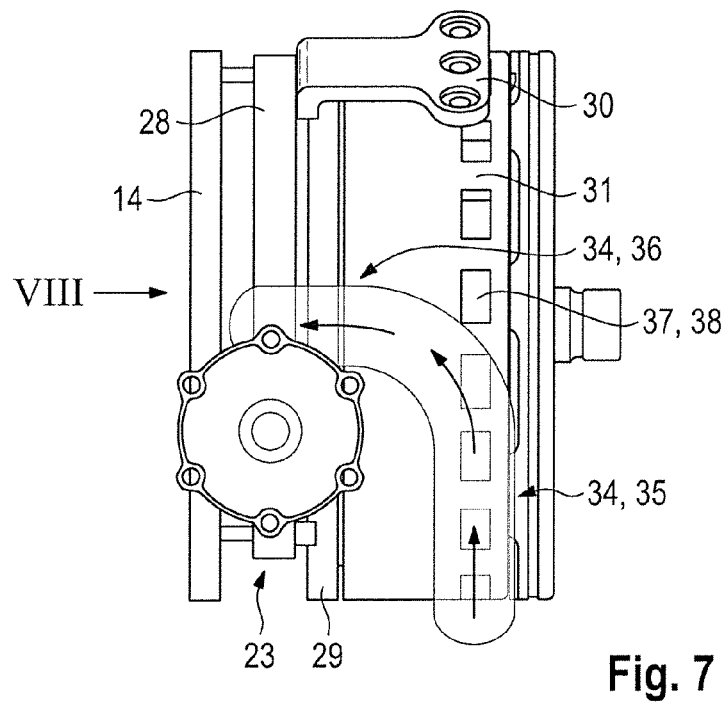
FIG. 7 is a plan view of FIG. 6.

FIG. 1 is a perspective view of assemblies of a hybrid module 10 according to the invention, and FIG. 2 is a detail cross section through the hybrid module 10. The hybrid module 10 has an electric machine 11, a transmission 12 and a separating clutch 13 for connecting an internal combustion engine to the hybrid module 10 in accordance with demand.

FIG. 1 shows a cover 14 that delimits the transmission 12 adjacent to the electric machine 11 and a drive-output-side transmission output shaft 15. The transmission 12 has a transmission input shaft 16 that is coupled permanently a rotor-side drive shaft 17 of the electric machine 11, as shown in FIG. 2.

The separating clutch 13 that connects the internal combustion engine to the hybrid module 10 in accordance with demand has a rotating clutch disk 18 to which a crankshaft 20 of an internal combustion engine is coupled with the interposition of a damper 19, as shown in FIGS. 1 and 2. The separating clutch 13 can be closed and opened by an actuating mechanism 21 in the form of a clutch operator.

The transmission 12, the electric machine 11 and the separating clutch 13 are accommodated in a common housing 22 of the hybrid module 10, as shown in FIG. 2. The cover 14 separates the oil-charged assemblies of the transmission 12 from the electric machine 11, and an air-filled cavity 23 is formed between the transmission 12 and the electric machine 11.

The electric machine 11 of the hybrid module 10 is an external-rotor motor. Thus, a rotor part 24 of the electric machine 11 surrounds a stator part 25 at least in sections, radially to the outside. FIG. 2 shows a stator support 26 that bears windings 27 of the stator 25. The rotor 24 radially surrounds the windings 27 of the stator 25, at least in sections The stator 25 of the electric machine 11 can be installed in the housing 22 of the hybrid module 10 by fastening segments 28 that engage on the support 26.

The electric machine 11 has a control ring 29 with a contact section 30 that provides electrical connection of power supply lines to the control ring 29.

The rotor part 24 of the electric machine 11 of the hybrid module 10 has a fan impeller 31 that rotates together with the rotor part 24. The fan impeller 31 concentrically surrounds the rotor part 24, at least in sections, and is radially outside the rotor part 24. Thus, the fan impeller 31 can draw air out of the air-filled cavity 23 between the transmission 12 and electric machine 11, and can direct the air in the axial direction, as shown by the arrow 32 in FIG. 2. Thus, the air is conducted over, around or through the windings 27 of the stator 25 of the electric machine 11 and is heated by the windings 27. The air that has been heated by the windings 27 then is conveyed in the radial direction into a housing-side flow duct 34, as shown by the arrow 33 in FIG. 2. The housing-side flow duct 34 accumulates the air that is heated at the stator windings 27 of the electric machine 11.

The heated air can be returned via the flow duct 34 in the direction of the cavity 23.

FIGS. 5 to 8 each show the flow path of the air that functions to cool the windings 27 of the stator 25 of the electric machine 11. The envelope curve of the flow path corresponds to the contour of the flow duct 34 of the housing 22.

The air that is accumulated in the flow duct 34 can be returned in the direction of the cavity 23 via the flow duct 34, can be cooled in the region of the flow duct 34 and/or in the region of the cavity 23.

A first section 35 of the flow duct 34 extends along the circumferential extent of the fan impeller 31 with a radial spacing to the fan impeller 31. Heated air can enter the first section 35 of the flow duct 34 in the radial direction via the fan impeller 31. The first section 35 of the flow duct 34 has a flow cross section that increases in size as viewed in the throughflow direction of said flow duct or as viewed in the direction of rotation of the fan impeller 31. Accordingly, FIG. 2 shows that the cross section of the first section 35 of the flow duct 34 is smaller in the upper cross section in FIG. 2 than in the lower cross section in FIG. 2. The flow paths in FIGS. 5 to 8 likewise illustrate that the flow cross section of the first section 35 of the flow duct 34 increases in size in the throughflow direction.

The first section 35 of the flow duct 34 is adjoined by a second section 36 of the flow duct 34. Heated air that has been collected in the first section 35 can be returned via the second section 36 in the axial direction from the first section 35 in the direction of the cavity 23.

The fan impeller 31 and the rotor 24 of the electric machine 11 each have recesses 37, 38 that are spaced apart from one another in a circumferential direction. The recesses 37, 38 permit the passage of heated air in the radial direction from the windings 27 into the first section 35 of the flow duct 34.

The fan impeller 31 concentrically surrounds the rotor 24 in such a way that the recesses 37, 38 of fan impeller 31 and rotor 24 are at least partially in alignment in a radial direction. Thus, air that is heated at the windings 27 can flow through the recesses to the first section 35 of the flow duct 34.

The recesses 37 in the fan impeller 31 and possibly also the recesses 38 in the rotor 24 are delimited by flow-enhancing rotor blade contours to increase the suction action of the fan impeller 31 and thus the flow rate of air that can be drawn in, thereby ultimately improving the cooling of the windings 27 by the air.

Air that is accumulated in the flow duct 34 and returned via the flow duct in the direction of the cavity 23 can be cooled both in the region of the flow duct 34 and in the region of the cavity 23.

If the air is cooled in the region of the cavity 23, the support 26 of the stator 25 of the electric machine 11 functions as a heat sink, so that the support 26 of the stator 25 of the electric machine 11 is water-cooled.

The support 26 delimits the air-filled cavity 23 adjacent to the electric machine 11, and the cover 14 of the transmission 12 delimits the cavity 23 adjacent to the transmission 12. The air that is returned into the cavity 23 flows over a face surface 39 of the support 26 of the stator 25 of the electric machine 11 facing toward the cavity 23, and in the process can be cooled on the face surface due to the water-cooled design of the support 26.

Figure 8:
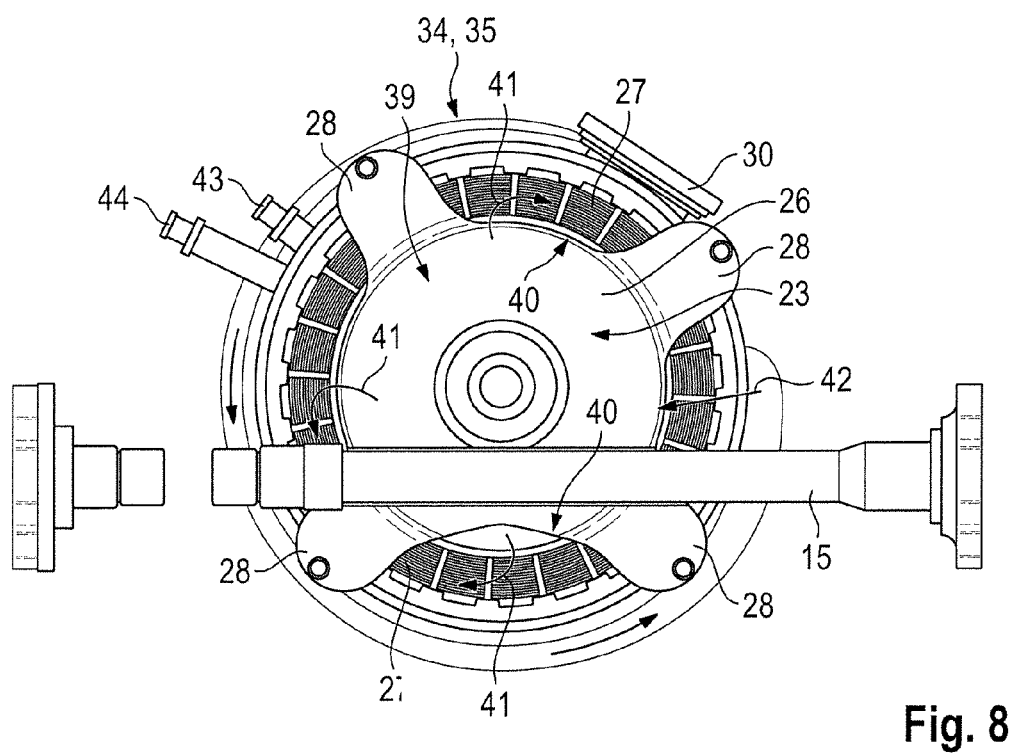
FIG. 8 is a view of the arrangement from FIG. 7 in the view direction VIII of FIG. 7.

As shown in FIG. 8, the support 26 of the stator 25 of the electric machine 11 has recesses 40 for the axial passage of the cooled air from the cavity 23 in the direction of the windings 27. Arrows 41 illustrate this axial passage of the cooled air from the cavity 23 in the direction of the windings 27. An arrow 42 illustrates the return of the air from the second section 36 of the flow duct 34 into the cavity 23.

If it is alternatively or additionally intended for the heated air to be cooled in the region of the flow duct 34, the flow duct 34 preferably is assigned at least one water-cooled cooler over which the heated air can be conducted. Each water-cooled cooler that functions to cool heated air in the region of the flow duct 34 preferably is assigned to the second section 36 of the flow duct 34. A cooler of this type is not shown in the figures.

Accordingly the invention provides a hybrid module 10 for a hybrid vehicle. The hybrid module comprises an electric machine 11, a transmission 12 and a separating clutch 13 for coupling an internal combustion engine in accordance with demand. The transmission 12, the electric machine 11 and the separating clutch 13 preferably are positioned in a common housing 22 of the hybrid module.

An air-filled cavity 23 is formed between the transmission 12 and the electric machine 11. The air-filled cavity 23 is delimited at one side axial side by the housing-side cover 14 and at the other axial side by the support 26 of the stator 25 of the electric machine 11.

The electric machine 11 is in the form of an external-rotor motor. The rotor 24 adjoins the windings 27 of the stator 25 of the electric machine radially to the outside and rotates together with the fan impeller 31.

The fan impeller 31 causes the air in the cavity 23 to be circulated constantly. More particularly, the fan impeller 31 initially draws the air from the cavity 23 in an axial direction (flow arrows 32, 41 in FIGS. 2 and 6) and conducts the air over the windings 27 of the electric machine. The air then is conducted in the radial direction (flow arrows 33 in FIGS. 2, 5 and 6) via openings 37, 38 in the rotor 24 and in the fan impeller 31 into the first section 35 of the flow duct 34. The first section 35 of the flow duct 34 is of encircling configuration in the circumferential direction, and accumulates the heated air therein. The first section 35 of the flow duct 34 has a flow cross section that increases in size as viewed in the throughflow direction.

Air that is accumulated in the flow duct 34 can be returned in the direction of the cavity 23 via the second section 36 of the flow duct 34 (flow arrows 42 of FIG. 2), to provide a closed circuit for circulated air.

The accumulated heated air is cooled in the region of the second section 36 of the flow duct 34 and/or in the region of the cavity 23. The cooling in the region of the cavity 23 is preferable, because the support 26 of the stator 25 of the electric machine 11 can be utilized as a heat sink in an effective manner.

FIGS. 1, 3, 4, 5, 6 and 8 show a coolant supply for the support 26 of the stator 25 of the electric machine 11, specifically a cooling water supply line 43 and a cooling water discharge line 44.

Cooling fins may be formed on the face surface 39 of the support 26 of the stator 25 of the electric machine 11 that delimits the cavity 23.

The invention has been described on the basis of a drive module in the form of a hybrid module 10 of a hybrid vehicle. However, the invention is not restricted to this application and may be used for a drive module of an electric module for an electric vehicle. An electric module of said type does not have the separating clutch 13 which, in the case of a hybrid module, serves for the connection of an internal combustion engine in accordance with demand.

What is claimed is:

1. A drive module for a vehicle, comprising:
   a transmission with an input shaft; and
   an electric machine coupled to the input shaft of the transmission, with an air-filled cavity being formed between the electric machine and the transmission, the electric machine being in the form of an external-rotor motor having a rotor surrounding a stator of said external-rotor motor, at least in sections, a fan impeller rotating together with the rotor and being configured to draw air out of the air-filled cavity in an axial direction and to draw the air through windings of the stator for cooling purposes, and subsequently to convey the air in a radial direction and into a housing-side flow duct in which heated air can be accumulated and via which the air can be returned toward the cavity, wherein the heated air can be cooled in proximity to the flow duct and/or in proximity to the cavity.

2. The drive module of claim 1, wherein the stator comprises a support delimiting the air-filled cavity adjacent to the electric machine in an axial direction, and a cover delimiting the cavity adjacent to the transmission in an axial direction.

3. The drive module of claim 2, wherein the support of the stator is water-cooled for cooling air in proximity to the cavity.

4. The drive module of claim 2, wherein the support of the stator has recesses for axial passage of cooled air out of the cavity and toward the windings of the stator.

5. The drive module of claim 1, further comprising a water-cooled cooler for cooling air in proximity to the flow duct.

6. The drive module of claim 1, wherein the flow duct has a first section that extends along a circumferential extent of the fan impeller with a radial spacing, so that heated air flows radially from the fan impeller into the flow duct along the circumferential extent of the fan impeller.

7. The drive module of claim 1, wherein the flow duct has a flow cross section that increases in size in a circumferential direction.

8. The drive module of claim 7, wherein the flow cross section of the first section of the flow duct increases in size as viewed in a throughflow direction thereof and in the direction of rotation of the fan impeller.

9. The drive module of claim 5, wherein the flow duct has a second section that adjoins the first section of the flow duct and conducts the heated air axially from the first section of the flow duct toward the cavity.

10. The drive module of claim 9, wherein the second section of the flow duct has a water-cooled cooler for cooling the heated air in proximity to the flow duct.

11. The drive module of claim 6, wherein the fan impeller and the rotor, to which the fan impeller is connected, have circumferentially spaced recesses that permit a radial passage of heated air from the windings of the stator into the first section of the flow duct.

12. The drive module of claim 11, wherein the recesses in the fan impeller and the recesses in the rotor of the electric machine are delimited by flow-enhancing rotor blade contours.

13. The drive module of claim 11, wherein the fan impeller concentrically surrounds the rotor, in sections, so that the recesses of fan impeller and rotor are aligned at least partially in a radial direction.

14. The drive module of claim 1, wherein the drive module is a hybrid module for a hybrid vehicle, the drive module having a separating clutch by means of which a crankshaft of an internal combustion engine can be coupled to the hybrid module.

15. The drive module of claim 1, wherein the drive module is an electric module for an electric vehicle.

* * * * *